US012719118B2

(12) United States Patent
Ko et al.

(10) Patent No.: US 12,719,118 B2
(45) **Date of Patent: *Aug. 25, 2026**

(54) BUTTON CELL

(71) Applicant: SAMSUNG SDI CO., LTD., Yongin-si (KR)

(72) Inventors: Heejung Ko, Yongin-si (KR); Kijung Kim, Yongin-si (KR); Yongjin Park, Yongin-si (KR); Byongchul Woo, Yongin-si (KR); Jong-Ha Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 639 days.

This patent is subject to a terminal disclaimer.

(21) Appl. No.: 18/313,633

(22) Filed: May 8, 2023

(65) Prior Publication Data

US 2023/0275293 A1 Aug. 31, 2023

Related U.S. Application Data

(63) Continuation of application No. 17/224,419, filed on Apr. 7, 2021, now Pat. No. 11,695,180.

(30) Foreign Application Priority Data

Jul. 1, 2020 (KR) ........................ 10-2020-0081158

(51) Int. Cl.
*H01M 50/181* (2021.01)
*H01M 50/109* (2021.01)
(Continued)

(52) U.S. Cl.
CPC ....... *H01M 50/181* (2021.01); *H01M 50/109* (2021.01); *H01M 50/153* (2021.01);
(Continued)

(58) Field of Classification Search
CPC ............. H01M 50/109; H01M 50/181; H01M 50/153; H01M 10/0427; H01M 10/124; H01M 10/285; H01M 50/559
See application file for complete search history.

(56) References Cited

U.S. PATENT DOCUMENTS 11,695,180 B2 * 7/2023 Ko ...................... H01M 50/188 429/179
2002/0142216 A1 * 10/2002 Skoumpris .......... H01M 50/176 429/94
(Continued)

FOREIGN PATENT DOCUMENTS

CN 204596910 U 8/2015
CN 109192889 A * 1/2019 .......... H01M 50/169
(Continued)

OTHER PUBLICATIONS

Extended European Search report dated Dec. 23, 2021 issued in corresponding European Application No. 21179265.0, 11 pages.
(Continued)

*Primary Examiner* — Jeremiah R Smith
(74) *Attorney, Agent, or Firm* — Womble Bond Dickinson (US) LLP

(57) ABSTRACT

A rechargeable battery includes: an electrode assembly including a first electrode, a second electrode, and a separator between the first electrode and the second electrode; a case including an inner space accommodating the electrode assembly, and an opening; a cap plate coupled to the case at the opening and including a terminal hole exposing the inner space; an electrode terminal electrically connected to the electrode assembly through the terminal hole and overlapping the cap plate; electrode tabs respectively connected to the first electrode and the second electrode; and an electrolyte solution in the inner space, and at least one electrode tab of the electrode tabs has an inclined portion that is inclined
(Continued)

at a first angle with respect to a surface of the electrode assembly facing the at least one electrode tab.

16 Claims, 6 Drawing Sheets

(51) Int. Cl.
*H01M 50/153* (2021.01)
*H01M 50/533* (2021.01)
*H01M 50/547* (2021.01)
*H01M 50/559* (2021.01)

(52) U.S. Cl.
CPC ....... *H01M 50/533* (2021.01); *H01M 50/547* (2021.01); *H01M 50/559* (2021.01)

(56) References Cited

U.S. PATENT DOCUMENTS

| | | | | |
|---|---|---|---|---|
| 2006/0099495 | A1* | 5/2006 | Suzuki | H01M 10/0525 429/231.95 |
| 2015/0236370 | A1* | 8/2015 | Ensling | H01M 10/0427 429/94 |
| 2017/0207491 | A1 | 7/2017 | Tamachi et al. | |
| 2019/0221824 | A1 | 7/2019 | Tsuji | |
| 2021/0184184 | A1 | 6/2021 | Woo | |
| 2021/0328290 | A1* | 10/2021 | Lee | H01M 10/0427 |
| 2021/0359362 | A1* | 11/2021 | Wang | H01M 10/0422 |
| 2021/0384482 | A1* | 12/2021 | Deng | H01M 50/3425 |
| 2021/0399368 | A1 | 12/2021 | Ko et al. | |
| 2021/0408650 | A1* | 12/2021 | Guo | H01M 50/109 |
| 2023/0178832 | A1* | 6/2023 | Chen | H01M 50/166 429/94 |

FOREIGN PATENT DOCUMENTS

| | | | |
|---|---|---|---|
| CN | 110224172 | A | 9/2019 |
| CN | 110364676 | A | 10/2019 |
| CN | 112993374 | A | 6/2021 |
| CN | 113839077 | A | 12/2021 |
| EP | 3 836 269 | A1 | 6/2021 |
| EP | 3 905 365 | A1 | 11/2021 |
| JP | 2002-231197 | | 8/2002 |
| WO | WO 2018061381 | A1 | 4/2018 |
| WO | WO 2020137372 | A1 | 7/2020 |

OTHER PUBLICATIONS

Chinese Office Action dated Jan. 14, 2025, issued in corresponding Chinese Patent Application No. 202110630943.2 (5 pages).

Chinese Office Action dated Dec. 27, 2023, issued in corresponding Chinese Patent Application No. 202110630943.2 (13 pages, including 7 pages of English translation).

* cited by examiner

BUTTON CELL

CROSS-REFERENCE TO RELATED APPLICATIONS

This application is a continuation of U.S. application Ser. No. 17/224,419, filed on Apr. 7, 2021, which claims priority to and the benefit of Korean Patent Application No. 10-2020-0081158, filed on Jul. 1, 2020 in the Korean Intellectual Property Office, the entire contents of both of which are incorporated herein by reference.

BACKGROUND

1. Field

Aspects of embodiments of the present invention relate to a rechargeable battery.

2. Description of the Related Art

A rechargeable battery differs from a primary battery in that it can be repeatedly charged and discharged, while the latter is incapable of being recharged. A low-capacity rechargeable battery is used in a portable electronic device, such as a mobile phone, a notebook computer, and a camcorder, and a large-capacity rechargeable battery is widely used as a power source for driving a motor of a hybrid vehicle and the like.

As typical rechargeable batteries, there are a nickel-cadmium (Ni—Cd) battery, a nickel-hydrogen (Ni-MH) battery, a lithium (Li) battery, a lithium ion (Li-ion) rechargeable battery, etc. Particularly, the Li-ion rechargeable battery has an operating voltage that is three times as high as those of the Ni—Cd battery and the Ni-MH battery that are widely used as a power supply of portable electronic devices. In addition, the Li-ion rechargeable battery has been widely used because an energy density per unit weight thereof is high.

Particularly, as demand for wearable devices, such as a headphone, an earphone, a smartwatch, and a body-worn medical device using Bluetooth, has increased, a need for a rechargeable battery having a high energy density and an ultra-small size has increased.

The ultra-small rechargeable battery may include a coin cell or a button cell. Since an entire height of the coin cell or button cell is low, a difference in battery capacity may occur depending on an inner structure thereof.

In addition, due to its ultra-small size, an electrolyte solution may not be easily supplied into an electrode assembly.

The above information disclosed in this Background section is only for enhancement of understanding of the background of the invention, and, therefore, it may contain information that does not form the prior art that is already known in this country to a person of ordinary skill in the art.

SUMMARY

According to an aspect of embodiments of the present invention, an ultra-small rechargeable battery in which an electrolyte solution may easily flow into an electrode assembly is provided.

According to one or more embodiments, a rechargeable battery includes: an electrode assembly including a first electrode, a second electrode, and a separator between the first electrode and the second electrode; a case including an inner space accommodating the electrode assembly, and an opening; a cap plate coupled to the case at the opening and including a terminal hole exposing the inner space; an electrode terminal electrically connected to the electrode assembly through the terminal hole and overlapping the cap plate; electrode tabs respectively connected to the first electrode and the second electrode; and an electrolyte solution in the inner space, wherein at least one electrode tab of the electrode tabs has an inclined portion that is inclined at a first angle with respect to a surface of the electrode assembly facing the at least one electrode tab.

The first angle may be 10 degrees or less.

The at least one electrode tab may further include a flat portion that extends from the inclined portion and is electrically connected to a bottom surface of the case or to the electrode terminal.

The at least one electrode tab may include a first electrode tab connecting the first electrode and the bottom surface of the case; and a second electrode tab connecting the second electrode and the electrode terminal, and the first electrode may be a negative electrode and the second electrode may be a positive electrode.

The inclined portion of the first electrode tab may be connected to the bottom surface of the case at a second angle, the inclined portion of the second electrode tab may be connected to a lower surface of the electrode terminal at a third angle, and the second angle and the third angle may be the same as the first angle.

A length of the at least one electrode tab may be larger than half of a diameter of the electrode assembly, and may be smaller than the diameter of the electrode assembly.

The electrode assembly may further include a center pin at a center of the electrode assembly, and the flat portion may overlap the center pin.

The inclined portion and the flat portion may be connected to each other at an obtuse angle.

The electrode terminal may include a flange portion covering the terminal hole and overlapping the cap plate, and a protrusion integrally formed with the flange portion and protruding from the flange portion toward the terminal hole.

An outer surface of the protrusion may have a curved surface and an inclined surface, and a distance from the curved surface to an end portion of the cap plate exposed by the terminal hole may be shorter than a distance from the inclined surface to the end portion of the cap plate exposed by the terminal hole, and the distance to the end portion of the cap plate exposed by the terminal hole may become longer moving closer to an end portion of the inclined portion.

The rechargeable battery may further include a thermal-fusion layer between the cap plate and the flange portion and insulation-bonding the cap plate and the flange portion.

The thermal-fusion layer may melt at a predetermined temperature.

According to an aspect of embodiments of the present invention, an electrode tab is obliquely connected to an electrode assembly, such that an electrolyte solution may be easily supplied into the electrode assembly due to the electrode tab not preventing the electrolyte solution from moving into the electrode assembly.

DESCRIPTION OF REFERENCE DESIGNATORS

Figure 1:
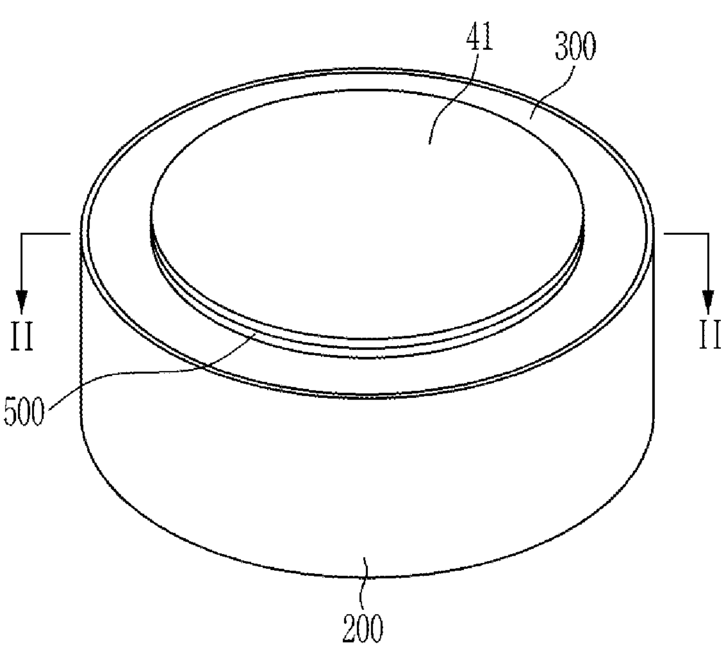
FIG. 1 is a perspective view of a rechargeable battery according to an embodiment of the present invention.

| | |
|---|---|
| 11: first electrode | 12: second electrode |
| 13: separator | 30: step portion |
| 41: flange portion | 42: protrusion |
| 100: electrode assembly | 200: case |
| 300: cap plate | 400: electrode terminal |
| 500: thermal-fusion layer | |

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, unless explicitly described to the contrary, it is to be understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, in this specification, it is to be understood that when one component is referred to as being "connected" or "coupled" to another component, it may be connected or coupled directly to the another component or connected or coupled to the another component with one or more other components intervening therebetween.

Singular forms are to include plural forms unless the context clearly indicates otherwise.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, a rechargeable battery according to one or more embodiments will be described with reference to the accompanying drawings.

A rechargeable battery according to an embodiment of the present invention is an ultra-small rechargeable battery, and may include a coin cell or a button cell, but the present invention is not limited thereto, and may include a cylindrical or pin-type cell.

Here, the coin cell or the button cell is a thin coin-type or button-type cell, and may mean a battery having a ratio (height/diameter) of a height to a diameter of 1 or less, but is not limited thereto.

In an embodiment, the coin cell or the button cell is cylindrical, and a horizontal cross-section is circular, but the present invention is not limited thereto, and a horizontal cross-section may be oval or polygonal. In this case, the diameter may mean a maximum distance of the cell based on a horizontal direction of the cell, and the height may mean a maximum distance (distance from a flat bottom surface thereof to a flat uppermost surface) of the cell based on a vertical direction of the cell.

Figure 2:
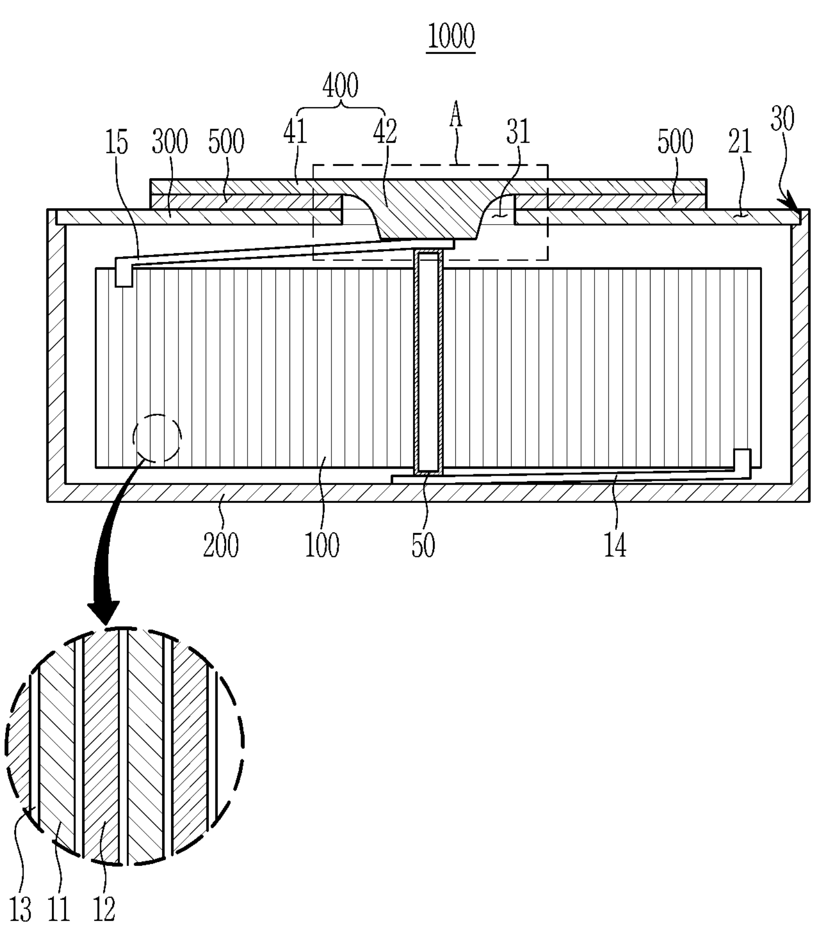
FIG. 2 is a cross-sectional view taken along the line II-II of FIG. 1.
Figure 3:
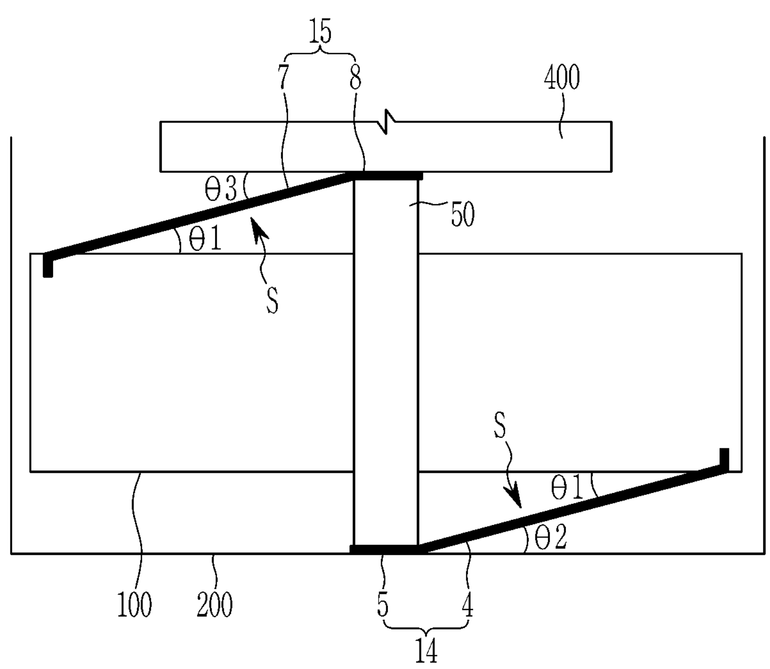
FIG. 3 is a schematic view illustrating an electrode tab according to an embodiment of the present invention.

FIG. 1 is a perspective view of a rechargeable battery according to an embodiment of the present invention; FIG. 2 is a cross-sectional view taken along the line II-II of FIG. 1; and FIG. 3 is a schematic view illustrating an electrode tab according to an embodiment of the present invention.

Referring to FIG. 1 and FIG. 2, a rechargeable battery 1000 according to an embodiment of the present invention includes an electrode assembly 100, a case 200 having an inner space accommodating the electrode assembly 100, a cap plate 300 coupled to the case 200 to seal the inner space, and an electrode terminal 400 penetrating through the cap plate to be electrically connected to the electrode assembly 100.

A lower surface of the electrode assembly 100 faces an inner bottom surface of the case 200, and an upper surface of the electrode assembly 100 faces a lower surface of the cap plate 300 covering an opening 21 of the case 200.

The electrode assembly 100 includes a first electrode 11, a second electrode 12, and a separator 13, and the first electrode 11 and the second electrode 12 are positioned on both sides of the separator 13, which is an electrically insulating material.

The first electrode 11 includes an electrode active region, which is an area in which an active material is applied to a thin plate formed of a long strip-shaped metal foil, and an electrode uncoated region, which is an area to which no active material is applied; and a first electrode tab 14 may be connected to the electrode uncoated region.

The electrode uncoated region may be respectively formed at opposite end portions of the electrode active region, that is, at respective end portions of the first electrode 11 in a length direction thereof, but is not limited thereto, and, in an embodiment, may be formed only at one end portion. In an embodiment, the first electrode 11 may be a negative electrode, and in the electrode active region, an active material, such as graphite or carbon, may be coated on a metal foil, such as copper or nickel.

In an embodiment, the first electrode tab 14 is electrically connected to the electrode uncoated region of the first electrode 11 of the electrode assembly 100, and protrudes to the outside of the electrode assembly 100 to be welded to a bottom surface of the case 200 to electrically connect the first electrode 11 to the case 200. Accordingly, the case 200 connected to the first electrode 11 with the first electrode tab 14 has the same polarity as the first electrode 11.

Referring to FIG. 3, in an embodiment, a length of the first electrode tab 14 may be longer than half of a diameter, or longer than a radius, of the electrode assembly 100, and may be shorter than the diameter such that the first electrode tab 14 may facilitate a welding process and may not be wrinkled.

In an embodiment, the first electrode tab 14 may have an inclined portion 4 obliquely connected to the electrode assembly 100 at an angle of 10 degrees or less. That is, a surface of the inclined portion 4 facing the electrode assembly 100 may have a first angle 81 of 10 degrees or less with respect to a lower surface of the electrode assembly 100. In this case, the lower surface of the electrode assembly 100 is a virtual horizontal surface on which an end portion of a protruding membrane is positioned and that is parallel to an inner surface of the case 200.

The first electrode tab 14 may have a flat portion 5 that extends from the inclined portion 4 and is attached to the bottom surface of the case 200. In an embodiment, a surface of the flat portion 5 is parallel to and attached to the bottom surface of the case 200, the inclined portion 4 may be connected to the bottom surface of the case 200 at a second angle 82. In an embodiment, the second angle 82 may be the same as the first angle 81.

The flat portion 5 may be connected to the inclined portion 4 at an obtuse angle, and, in an embodiment, the flat portion 5 may be pressed by a center pin 50.

As described above, when the first electrode tab 14 is provided with the inclined portion 4 obliquely connected to the electrode assembly 100, the electrode assembly 100 is spaced apart from the inclined portion by a space S, such that an electrolyte solution may not be obstructed by the first electrode tab 14 to easily flow into the electrode assembly 100.

The second electrode 12 includes an electrode active region, which is an area in which an active material is applied to a thin plate formed of a long strip-shaped metal foil, and an electrode uncoated region, which is an area to which no active material is applied; and a second electrode tab 15 may be connected to the electrode uncoated region.

The electrode uncoated region may be respectively formed at opposite end portions of the electrode active region, that is, at respective end portions of the second electrode 12 in a length direction thereof, but is not limited thereto, and, in an embodiment, may be formed only at one end portion.

The second electrode tab 15 may be connected to the electrode uncoated region of the second electrode 12, and the second electrode tab 15 may protrude from the second electrode 12 to be electrically connected to the electrode terminal 400. The second electrode tab 15 may be made of an electrically conductive material, such as nickel or copper, and may be connected to the electrode uncoated region by welding. In an embodiment, the welding may be laser welding.

In an embodiment, the second electrode 12 may be a positive electrode, and in the electrode active region, an active material, such as a transition metal oxide, may be coated on a metal foil, such as aluminum.

The second electrode tab 15 is electrically connected to the electrode uncoated region of the second electrode 12 of the electrode assembly 100, and protrudes to the outside of the electrode assembly 100 to be welded to a lower surface of the electrode terminal 400 to electrically connect the second electrode 12 to the electrode terminal 400. By the second electrode tab 15, the electrode terminal 400 has the same polarity as that of the second electrode 12.

In an embodiment, a length of the second electrode tab 15 may be longer than half of a diameter, or longer than a radius, of the electrode assembly 100, and may be shorter than the diameter such that the second electrode tab 15 may facilitate a welding process and may not be wrinkled. After the second electrode tab 15 is fixed to the electrode terminal 400 by welding, the cap plate 300 may be welded to the case 200.

In an embodiment, the second electrode tab 15 may have an inclined portion 7 obliquely connected to the electrode assembly 100 at an angle of 10 degrees or less. That is, a surface of the inclined portion 7 facing the electrode assembly 100 may have a first angle 81 of 10 degrees or less with respect to an upper surface of the electrode assembly 100. In this case, the upper surface of the electrode assembly 100 is a virtual horizontal surface on which an end portion of a protruding membrane is positioned and that is parallel to an inner surface of the cap plate 300.

The second electrode tab 15 may have a flat portion 8 that extends from the inclined portion 7 and is attached to a lower surface of a protrusion of the terminal electrode 400. In an embodiment, a surface of the flat portion 8 is attached to a lower surface of the terminal electrode 400 in parallel, and the inclined portion 8 may be connected to the lower surface of the terminal electrode 400 at a third angle 83. In an embodiment, the third angle 83 may be the same as the first angle 81.

In an embodiment, the flat portion 8 may be pressed by the center pin 50. The flat portion 8 may be connected to the inclined portion 7 at an obtuse angle.

As described above, when the second electrode tab 15 is provided with the inclined portion 7 obliquely connected to the electrode assembly 100, the electrode assembly 100 is spaced apart from the inclined portion by a space S, such that an electrolyte solution may not be obstructed by the second electrode tab 15 to easily flow into the electrode assembly 100.

Referring back to FIG. 1 and FIG. 2, the separator 13 is positioned between the first electrode 11 and the second electrode 12 to prevent or substantially prevent a short circuit therebetween, and allows lithium ions to move. The separator 13 may be made of, for example, any of polyethylene, polypropylene, and a composite film of polyethylene and polypropylene.

In an embodiment, a width of the separator 13 may be equal to or larger than that of the first electrode 11 or the second electrode 12, and the width of first electrode 11 may be larger than that of the second electrode 12. In this case, the width is a length in a direction in which the electrode assembly 100 is inserted into the case.

The electrode assembly 100 may have a jelly roll shape in which the first electrode 11, the separator 13, and the second electrode 12 overlap to be wound around a rotation axis, but is not limited thereto, and may have a structure (not shown) in which a sheet-type first electrode, a separator, and a second electrode are repeatedly stacked.

In an embodiment, the electrode assembly 100 may be covered with an insulating tape (not shown) along a diameter-direction external circumferential surface. The insulating tape electrically insulates the external circumferential surface of the electrode assembly 100 from the inner surface of the case 200, while protecting the outside of the electrode assembly 100.

The electrode assembly 100 may be housed in the case 200 with an electrolyte solution in a direction parallel to the rotation axis of the electrode assembly 100. The electrolyte solution may be composed of an organic solvent, such as any of EC, PC, DEC, and EMC, and a Li salt, such as $LiPF_6$ and $LiBF_4$. The electrolyte solution may be in a liquid, solid, or gel state.

The center pin 50 penetrating through a center of the electrode assembly 100 in a vertical direction may be positioned at the center of the electrode assembly 100, and the center pin 50 may support the first electrode tab 14 and the second electrode tab 15. In an embodiment, a diameter of the center pin 50 may be approximately 1.2 mm.

The case 200 has a space in which the electrode assembly 100 and an electrolyte solution are accommodated, and an opening 21 of which one side is open. The electrode assembly 100 may be inserted through the opening 21 to be accommodated in the inner space of the case 200. The case 200 may have a cylindrical shape having a low height, but is not limited thereto, and may have any of various known shapes. The case 200 may accommodate any of various known electrolyte solutions along with the electrode assembly 100, and, in an embodiment, may be made of stainless steel.

The inner bottom surface of the case 200 is connected to the first electrode 11 of the electrode assembly 100 by the first electrode tab 14, such that the case 200 has the same polarity as that of the first electrode 11.

An outer surface of the case 200 may be a first electrode terminal of the rechargeable battery 1000, and an outer surface of the electrode terminal 400 may be a second electrode terminal of the rechargeable battery 1000.

The cap plate 300 closes and seals the inner space of the case 200, the electrode terminal 400 may be coupled to the opening 21 of the case 200, and the cap plate 300 may be coupled to the opening 21 by welding.

The cap plate 300 may be formed to have a shape corresponding to the opening 21, and a step portion 30 may be formed in the opening 21 such that the cap plate 300 may be easily mounted.

A terminal hole 31 is formed in a center of the cap plate 300, and the terminal hole 31 corresponds to the center of the electrode assembly 100 to expose the upper portion of the electrode assembly 100. The cap plate 300 may have a ring shape due to the terminal hole 31 formed in the center thereof.

The cap plate 300 is coupled to the case 200 and has the same polarity as that of the first electrode 11, and an outer surface of the cap plate 300 may be the first electrode terminal of the rechargeable battery 1000. In an embodiment, the cap plate 300 includes stainless steel, but is not limited thereto, and may include a metal such as aluminum, nickel, or copper.

The electrode terminal 400 is insulated from and bonded to the cap plate 300 having a different polarity from that of the electrode terminal 400, and may be electrically connected to the second electrode 12 of the electrode assembly 100 through the terminal hole 31 of the cap plate 300. Therefore, the electrode terminal 400 may be the second electrode terminal of the rechargeable battery 1000.

In an embodiment, the electrode terminal 400 may include stainless steel, but is not limited thereto, and may include a metal such as aluminum, nickel, or copper.

In an embodiment, the case 200 and the cap plate 300 may be connected to the first electrode 11, which is a negative electrode, such that the first electrode terminal may be a negative terminal, and the electrode terminal 400 may be electrically connected to the second electrode 12, which is a positive electrode, such that the second electrode terminal may be a positive terminal.

In an embodiment, the case 200 and the cap plate 300 may be made of a same material.

The electrode terminal 400 may include a flange portion 41 and a protrusion 42, the flange portion 41 may have a wider area (or diameter) than the protrusion 42, and the flange portion 41 has a thinner thickness than the protrusion 42. The protrusion 42 and the flange portion 41 may be integrally formed.

The protrusion 42 of the electrode terminal 400 is inserted into the terminal hole 31, and covers the terminal hole 31 of the cap plate 300 together with the flange portion 41 to seal the inside of the case 200. The protrusion 42 of the electrode terminal 400 is electrically connected to the second electrode tab 15 of the electrode assembly 100, such that the electrode terminal 400 has the same polarity as the second electrode 12. The outer surface of the flange part 41 may be the second electrode terminal of the rechargeable battery 1000.

Figure 4:
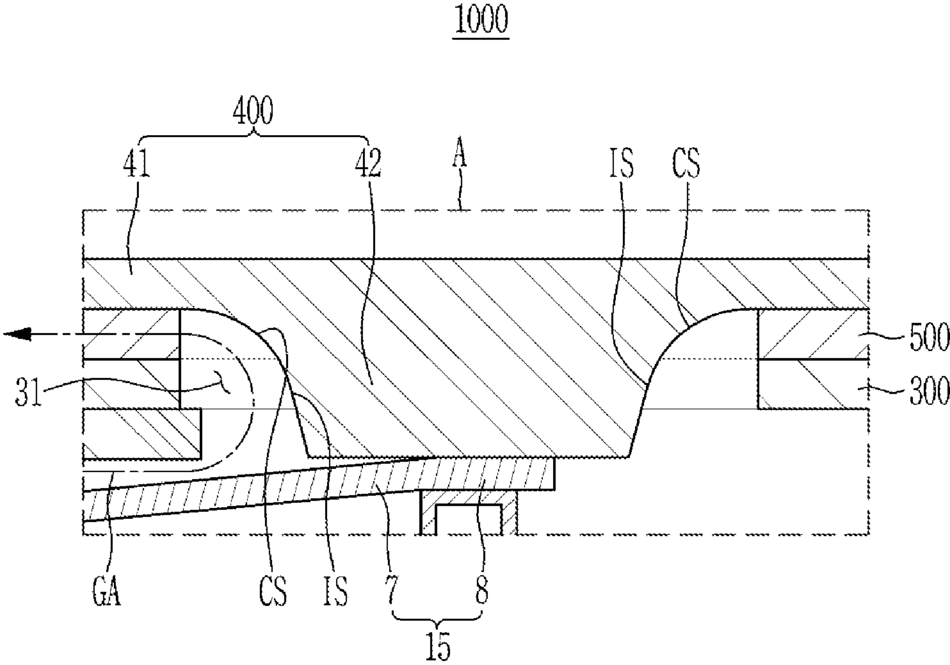
FIG. 4 is an enlarged view of a region "A" of FIG. 2.

FIG. 4 is an enlarged view of a region "A" of FIG. 2.

Referring to FIG. 4, in an embodiment, an outer surface of the protrusion 42 includes a curved surface CS and an inclined surface IS. The protrusion 42 includes the curved surface CS extending from a lower surface of the flange portion 41, and the inclined surface IS extending from the curved surface CS to pass through the terminal hole 31.

The curved surface CS may have a curvature radius (e.g., a predetermined curvature radius), and the inclined surface IS may have a slope (e.g., a predetermined slope). Accordingly, as the surface of the protrusion 42 proceeds from the curved surface CS to an end portion of the inclined surface IS, it is farther away from the end portion of the cap plate 300 exposed by the terminal hole 31. As described above, when the inclined surface IS is formed, a distance of the protrusion 42 positioned in the horizontal direction between the cap plate 300 and the electrode terminal 400 is increased, such that even if an alignment error occurs, a short circuit between the cap plate 300 and the protrusion 42, which have different polarities, may be avoided.

Referring back to FIG. 1 and FIG. 2, a lower surface of the flange part 41 of the electrode terminal 400 may be attached to a surface of the cap plate 300 through a thermal-fusion layer 500. Since the cap plate 300 and the electrode terminal 400 are bonded by the thermal-fusion layer 500, the opening 21 of the case 200 in which the electrode assembly 100 is accommodated is completely sealed by the cap plate 300, the electrode terminal 400, and the thermal-fusion layer 500.

The thermal-fusion layer 500 is thermally fusion-bonded between the cap plate 300 and the flange portion 41 of the electrode terminal 400 by heat or a laser beam.

The thermal-fusion layer 500 is made of an insulating material to insulate the electrode terminal 400 from the cap plate 300. The thermal-fusion layer 500 may include any of various known materials that insulation-bond the cap plate 300 and the electrode terminal 400.

In an embodiment, the thermal-fusion layer 500 is cured by heat, but may be melted at a predetermined temperature. In an embodiment, the predetermined temperature at which the thermal-fusion layer 500 melts may be a temperature exceeding a temperature of heat for curing the thermal-fusion layer 500, but is not limited thereto.

For example, the thermal-fusion layer 500 may include a thermosetting resin and a thermoplastic resin. The thermosetting resin and the thermoplastic resin of the thermal-fusion layer 500 may be stacked in a plurality of layers, but are not limited thereto. The thermosetting resin of the thermal-fusion layer 500 is in a state of being cured by heat, and may include any of various known thermosetting resins such as a phenol resin, a urea resin, a melamine resin, an epoxy resin, and a polyester resin. In an embodiment, the thermoplastic resin of the thermal-fusion layer 500 includes a polypropylene resin that melts at a predetermined temperature, but is not limited thereto, and may include any of various known thermoplastic resins such as polystyrene, polyethylene, and polyvinyl chloride resins.

As described above, in an embodiment, the thermal-fusion layer 500 melts at a predetermined temperature, and a portion from which the thermal-fusion layer 500 is removed becomes a ventilation channel through which gas is discharged.

When an unintended event (for example, a short circuit between both electrodes) occurs in the inner space of the rechargeable battery 1000, a temperature increases, and the thermal-fusion layer 500 melts due to the increased temperature, and a volume thereof is reduced, such that a ventilation channel through which gas GA generated inside the rechargeable battery is discharged to the outside is formed. The inner gas is guided from the inner space of the rechargeable battery 1000 along the curved surface CS of the electrode terminal 400 to the space between the flange portion 41 and the cap plate 300, which is the ventilation channel, to be quickly discharged to the outside, thereby suppressing a risk of explosion of the rechargeable battery 1000.

Figure 5:
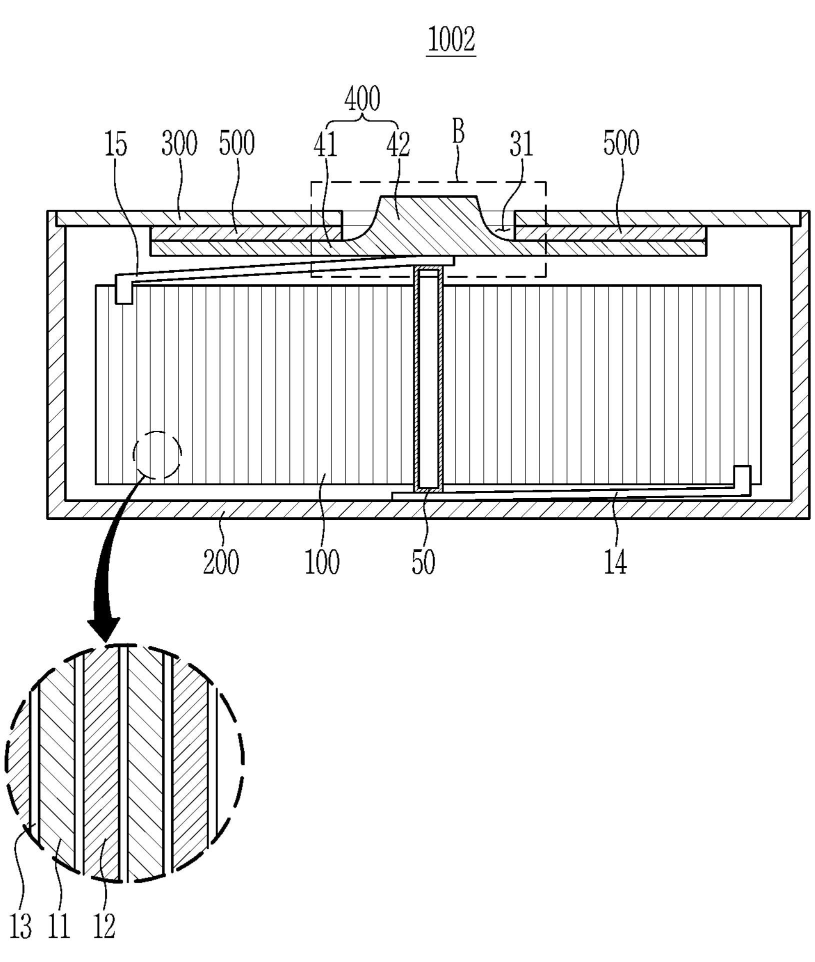
FIG. 5 is a cross-sectional view of a rechargeable battery according to another embodiment of the present invention.
Figure 6:
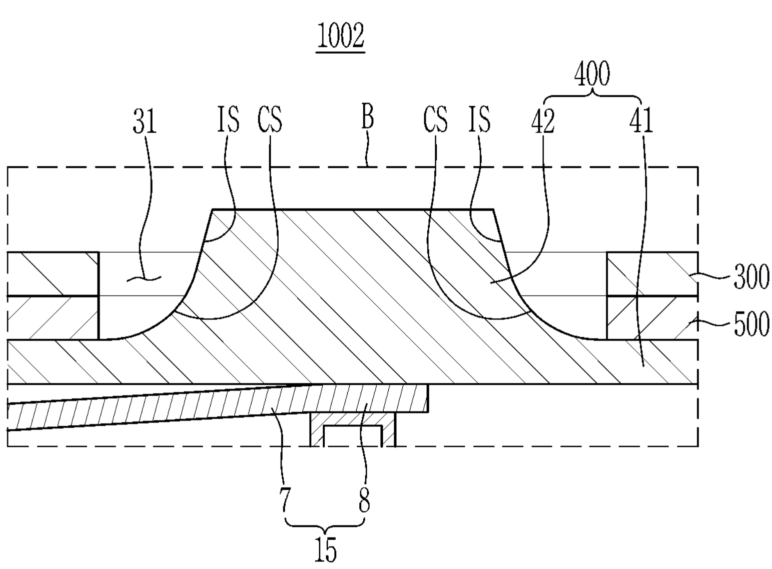
FIG. 6 is an enlarged view of a region "B" of FIG. 5.

FIG. 5 is a cross-sectional view of a rechargeable battery according to another embodiment of the present invention; and FIG. 6 is an enlarged view of a region "B" of FIG. 5.

A rechargeable battery 1002 according to an embodiment of the present invention shown in FIG. 5 and FIG. 6 is generally the same as the rechargeable battery shown in FIG. 1 to FIG. 3, and different parts will now be described.

Referring to FIG. 5 and FIG. 6, the rechargeable battery 1002 according to an embodiment of the present invention includes the electrode assembly 100, the case 200, the cap plate 300, the terminal plate 400, and the thermal-fusion layer 500.

The electrode assembly 100 includes the first electrode 11, the second electrode 12, and the separator 13, and the first electrode 11 may be electrically connected to the bottom surface of the case 200 through the first electrode tab 14.

The first electrode tab 14 may have the inclined portion 4 and the flat portion 5, and the inclined portion 4 may be obliquely connected to a virtual lower horizontal surface of the electrode assembly 100 at an angle of 10 degrees or less, and the flat portion 5 may be connected to the bottom surface of the case 200. The flat portion 5 may be pressed by the center pin 50. A length of the first electrode tab 14 may be longer than half of a diameter, or longer than a radius, of the electrode assembly 100, and may be shorter than the diameter such that the first electrode tab 14 may facilitate a welding process and may not be wrinkled.

The electrode terminal 400 is electrically connected to the second electrode 12, and is insulated and bonded to the cap plate 300 through the thermal-fusion layer 500. The electrode terminal 400 covers the terminal hole 31 of the cap plate 300.

The electrode terminal 400 is positioned between the cap plate 300 and the electrode assembly 100.

The electrode terminal 400 covers the central area of the opening 21 of the case 200 exposed by the terminal hole 31 of the cap plate 300. The electrode terminal 400 covers the central area of the opening 21, and the cap plate 300 covers the outer area of the opening 21, and, thus, the opening 21 of the case 200 is completely sealed by the electrode terminal 400 and the cap plate 300. The electrode terminal 400 is coupled to the second electrode tab 15 of the electrode assembly 100 to be electrically connected to the second electrode 12 of the electrode assembly 100.

The second electrode tab 15 may have the inclined portion 7 and the flat portion 8, and the inclined portion 7 may be obliquely connected to a virtual upper horizontal surface of the electrode assembly 100 at an angle of 10 degrees or less, and the flat portion 8 may be connected to the electrode terminal 400. The flat portion 8 may be pressed by the center pin 50. A length of the second electrode tab 15 may be longer than half of a diameter, or longer than a radius, of the electrode assembly 100, and may be shorter than the diameter such that the second electrode tab 15 may facilitate a welding process and may not be wrinkled.

The electrode terminal 400 includes the flange portion 41 and the protrusion 42. The flange portion 41 is positioned between the cap plate 300 and the electrode assembly 100 in the case 200, and overlaps the cap plate 300 to cover the terminal hole 31.

An upper surface of the flange portion 41 is in contact with the thermal-fusion layer 500, and the flange portion 41 is insulation-bonded to the cap plate 300 by the thermal-fusion layer 500. A lower surface of the flange portion 41 is electrically connected to the second electrode tab 15. As the flange portion 41 is connected to the second electrode tab 15, the protrusion 42 and the flange portion 41 of the electrode terminal 400 have the same polarity as that of the second electrode 12.

The protrusion 42 penetrates through the terminal hole 31 to be exposed to the outside of the case 200. An outer surface of the protrusion 42 may be the second electrode terminal of the rechargeable battery 1002.

The outer surface of the protrusion 42 may be positioned on a same plane or on a different plane from the outer surface of the cap plate 300. For example, a height of the outer surface of the protrusion 42 may be the same as that of the outer surface of the cap plate 300, but is not limited thereto, and the height of the outer surface of the protrusion 42 may be higher or lower than that of the outer surface of the cap plate 300.

In an embodiment, the outer surface of the protrusion 42 includes the curved surface CS and the inclined surface IS.

The protrusion 42 includes the curved surface CS extending from a lower surface of the flange portion 41, and the inclined surface IS extending from the curved surface CS to pass through the terminal hole 31.

The curved surface CS may have a curvature radius (e.g., a predetermined curvature radius), and the inclined surface IS may have a slope (e.g., a predetermined slope). Accordingly, as the surface of the protrusion 42 proceeds from the curved surface CS to an end portion of the inclined surface IS, the surface of the protrusion 42 is farther away from the cap plate 300, which is an edge of the terminal hole 31. As described above, when the inclined surface IS is formed, a distance of the protrusion 42 positioned in the horizontal direction between the cap plate 300 and the electrode terminal 400 is increased, such that even if an alignment error occurs, a short circuit between the cap plate 300 and the protrusion 42, which have different polarities, may be avoided.

As described above, when the flange portion 41 is connected through the thermal-fusion portion 500 within the case 200, and when a temperature inside the case 200 increases due to occurrence of an event and the thermal-fusion portion 500 melts, the flange portion 41 is separated from the cap plate 300 to move in the direction of gravity, such that the terminal hole 31 may be opened. Therefore, it is possible to prevent or substantially prevent explosion by more quickly discharging the inner gas to the outside compared with the embodiment of FIG. 1.

While the present invention has been described in connection with what are presently considered to be some practical embodiments, it is to be understood that the invention is not limited to the disclosed embodiments, but, on the contrary, is intended to cover various modifications and equivalent arrangements included within the spirit and scope of the appended claims.

What is claimed is:

1. A button cell comprising:

an electrode assembly comprising a first electrode, a second electrode, and a separator between the first electrode and the second electrode;

a case comprising an inner space accommodating the electrode assembly, and an opening;

a cap plate coupled to the case at the opening and comprising a terminal hole exposing the inner space;

an electrode terminal electrically connected to the electrode assembly through the terminal hole and overlapping the cap plate;

electrode tabs respectively connected to the first electrode and the second electrode; and an electrolyte solution in the inner space, wherein at least one electrode tab of the electrode tabs comprises an inclined portion that is inclined at a first angle with respect to a surface of the electrode assembly facing the at least one electrode tab, wherein the electrode terminal comprises:

a flange portion covering the terminal hole and overlapping the cap plate; and a protrusion protruding from the flange portion toward the terminal hole, and wherein an outer surface of the protrusion has a curved surface and an inclined surface, and a distance from the curved surface to an end portion of the cap plate exposed by the terminal hole is shorter than a distance from the inclined surface to the end portion of the cap plate exposed by the terminal hole, and the distance from the inclined surface to the end portion of the cap plate exposed by the terminal hole becomes longer moving closer to an end portion of the inclined portion.

2. The button cell of claim 1, wherein the first angle is 10 degrees or less.

3. The button cell of claim 1, wherein the at least one electrode tab further comprises a flat portion extending from the inclined portion and is electrically connected to a bottom surface of the case or to the electrode terminal.

4. The button cell of claim 3, wherein the at least one electrode tab comprises:

a first electrode tab connecting the first electrode and the bottom surface of the case; and a second electrode tab connecting the second electrode and the electrode terminal, and the first electrode is a negative electrode and the second electrode is a positive electrode.

5. The button cell of claim 4, wherein the inclined portion of the first electrode tab is connected to the bottom surface of the case at a second angle, the inclined portion of the second electrode tab is connected to a lower surface of the electrode terminal at a third angle, and the second angle and the third angle are the same as the first angle.

6. The button cell of claim 3, wherein a length of the at least one electrode tab is larger than half of a diameter of the electrode assembly and smaller than the diameter of the electrode assembly.

7. The button cell of claim 3, wherein the electrode assembly further comprises a center pin at a center of the electrode assembly, and the flat portion overlaps the center pin.

8. The button cell of claim 3, wherein the inclined portion and the flat portion are connected to each other at an obtuse angle.

9. The button cell of claim 1, wherein the protrusion is integrally formed with the flange portion.

10. The button cell of claim 1, further comprising a thermal-fusion layer between the cap plate and the flange portion and insulation-bonding the cap plate and the flange portion.

11. The button cell of claim 10, wherein the thermal-fusion layer melts at a predetermined temperature.

12. The button cell of claim 1, wherein the case further comprises a sidewall comprising a step portion recessed to correspond to an outline of the cap plate into which the outline of the cap plate is inserted.

13. The button cell of claim 1, wherein the electrode assembly further comprises a center pin at a center of the electrode assembly, and a length of the center pin in a vertical direction is longer than a length of the electrode assembly in the vertical direction.

14. The button cell of claim 1, wherein a diameter of the electrode terminal is smaller than a diameter of the cap plate, and the diameter of the cap plate is smaller than a diameter of the case.

15. A button cell comprising:

an electrode assembly comprising a first electrode, a second electrode, and a separator between the first electrode and the second electrode;

a case comprising an inner space accommodating the electrode assembly, and an opening;

a cap plate coupled to the case at the opening and comprising a terminal hole exposing the inner space;

an electrode terminal electrically connected to the electrode assembly through the terminal hole and overlapping the cap plate;

electrode tabs respectively connected to the first electrode and the second electrode; and an electrolyte solution in the inner space, wherein at least one electrode tab of the electrode tabs comprises an inclined portion that is inclined at a first angle with respect to a surface of the electrode assembly facing the at least one electrode tab, wherein the electrode assembly further comprises a center pin at a center of the electrode assembly, and a length of the center pin in a vertical direction is longer than a length of the electrode assembly in the vertical direction, and wherein the electrode terminal comprises:

a flange portion covering the terminal hole and overlapping the cap plate; and a protrusion protruding from the flange portion toward the terminal hole, wherein a diameter of the center pin in a horizontal direction is smaller than a diameter of the protrusion.

16. The button cell of claim 15, wherein a diameter of the electrode terminal is smaller than a diameter of the cap plate, and the diameter of the cap plate is smaller than a diameter of the case.

* * * * *